US005363650A

United States Patent [19]

Bodycoat et al.

[11] Patent Number: 5,363,650

[45] Date of Patent: Nov. 15, 1994

[54] HYDRAULIC CYLINDER ASSEMBLY FOR USE IN VARIABLE EXTERNAL PRESSURE ENVIRONMENTS

[75] Inventors: Peter R. Bodycoat, Newport; Louis P. DiNola, Cranston, both of R.I.

[73] Assignee: The United States of America as represented by the Secretary of the Navy, Washington, D.C.

[21] Appl. No.: 134,449

[22] Filed: Oct. 12, 1993

[51] Int. Cl.[5] ........................ F16D 31/00; F15B 15/17

[52] U.S. Cl. ........................................ 60/325; 60/413; 91/51; 91/417 R

[58] Field of Search ...................... 60/325, 413; 91/47, 91/51, 415, 417 R, 417 A

[56] References Cited

U.S. PATENT DOCUMENTS

| | | | |
|---|---|---|---|
| 2,984,218 | 5/1961 | Christianson | 51/417 R |
| 3,538,814 | 11/1970 | Fisher | 51/51 X |
| 5,050,380 | 9/1991 | Jonsson | 91/417 R X |

FOREIGN PATENT DOCUMENTS

| | | | |
|---|---|---|---|
| 2228689 | 12/1973 | Germany | 91/417 R |
| 3039200 | 5/1992 | Germany | 91/417 R |

*Primary Examiner*—Edward K. Look
*Assistant Examiner*—Hoang Nguyen
*Attorney, Agent, or Firm*—Michael J. McGowan; Prithvi C. Lall; James M. Kasischke

[57] ABSTRACT

A hydraulic cylinder assembly for use in a variable external pressure environment is provided. A hydraulic cylinder exposed to the variable external pressure environment has two chambers separated from one another by a piston. Hydraulic fluid fills each of the two chambers. In an "at rest" mode, the hydraulic fluid in the two chambers is pressurized to the variable external pressure. In an "at work" mode, pressure of the hydraulic fluid is selectively varied from the variable external pressure in one of the two chambers such that the piston moves. The entire assembly can be installed between the pressure and outer hulls of a submarine and utilize seawater to equalize the pressure in a balanced power stroke circuit.

19 Claims, 5 Drawing Sheets

HYDRAULIC CYLINDER ASSEMBLY FOR USE IN VARIABLE EXTERNAL PRESSURE ENVIRONMENTS

The invention described herein may be manufactured and used by or for the Government of the United States of America for Governmental purposes without the payment of any royalties thereon or therefor.

BACKGROUND OF THE INVENTION

1. Field of the Invention

The present invention relates generally to hydraulic cylinder assemblies, and more particularly to a hydraulic cylinder assembly that may be used in variable external pressure environments such as found on a submersible vehicle.

2. Description of the Prior Art

Commercially available hydraulic cylinders generally are designed to accommodate high internal pressure and, thus, are configured with seals designed to withstand such internal pressure. However, if used in an undersea, or other high external pressure environment, the seals tend to fail inwardly. Even if a commercially available hydraulic cylinder were adjusted to accept seawater as the operating fluid, problems related to material corrosion and seal contamination would likely develop. Thus, commercially available hydraulic cylinders are not currently considered for variable depth, deep sea applications. In deep sea applications, high cost, specially designed hydraulic cylinders are the only cylinders available.

SUMMARY OF THE INVENTION

Accordingly, it is an object of the present invention to provide a hydraulic cylinder assembly for use in variable external pressure environments.

Another object of the present invention is to provide a hydraulic cylinder assembly for variable depth, deep sea applications.

Still another object of the present invention is to provide a hydraulic cylinder assembly that incorporates a commercially available hydraulic cylinder for use in variable depth, deep sea applications to economize the cost of the hydraulic assembly.

Other objects and advantages of the present invention will become more obvious hereinafter in the specification and drawings.

In accordance with the present invention, a hydraulic cylinder assembly is provided for undersea usage at variable depths. A commercially available hydraulic cylinder has two chambers separated from one another by a piston. The hydraulic cylinder is externally subjected to depth pressure. First and second reservoirs are provided and are filled with hydraulic fluid. A first diaphragm is mounted in the first reservoir and exposed to depth pressure such that depth pressure deflects the first diaphragm to pressurize hydraulic fluid in the first reservoir to depth pressure. A second diaphragm is mounted in the second reservoir and exposed to a pressure different than depth pressure such that the second diaphragm deflects to pressurize hydraulic fluid in the second reservoir to the pressure different than depth pressure. A valve selectively ports the first and second reservoirs to the two chambers such that 1) only hydraulic fluid at depth pressure is ported to the two chambers when the hydraulic cylinder assembly is at rest, and 2) hydraulic fluid in the first reservoir is ported to a first of the two chambers while hydraulic fluid in the second reservoir is ported to a second of the two chambers when the hydraulic cylinder assembly is at work. The pressure different from depth pressure developed in the second reservoir causes movement of the piston.

BRIEF DESCRIPTION OF THE DRAWING(S)

Other objects, features and advantages of the present invention will become apparent upon reference to the following description of the preferred embodiments and to the drawings, wherein.

DESCRIPTION OF THE PREFERRED EMBODIMENT(S)

Figure 1:
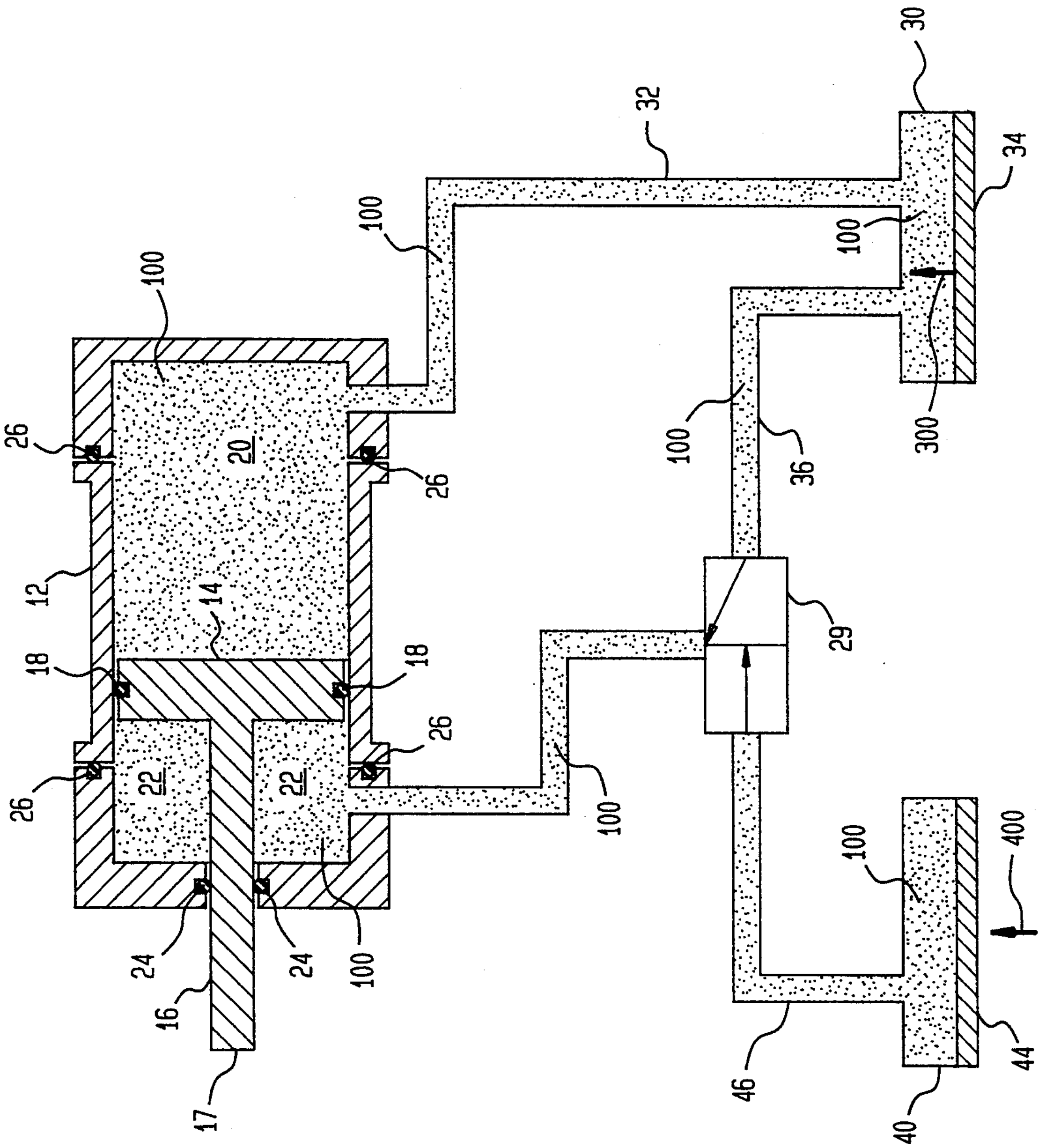
FIG. 1 is a schematic view of the hydraulic cylinder assembly according to the present invention.

Referring now to the drawings, and more particularly to FIG. 1, a schematic view is shown of the hydraulic cylinder assembly 10 according to the present invention. Assembly 10 includes a conventional hydraulic cylinder 12 having a piston 14 and rod 16 mounted therein. Movement of piston 14 can be controlled in accordance with the present invention to retract (or project) rod 16 in a linear fashion. Accordingly, rod 16 is used as a linear actuator to move a device (not shown) connected at its end 17 external to hydraulic cylinder 12. Seal 18 is provided about piston 14 to separate the interior chamber of hydraulic cylinder 12 into a first chamber 20 and second chamber 22. Another seal 24 is typically provided about rod 16 as it passes through hydraulic cylinder 12. Additional seals 26 are typically provided around the periphery of hydraulic cylinder 12 depending on the particular construction thereof. However, it is to be understood that the type and placement of seals 26 is not critical to the present invention.

First chamber 20 and second chamber 22 are each filled with a hydraulic fluid 100 (e.g., petroleum based hydraulic fluid such as those governed by Military Specification MIL-H17672D, Types 2075T-H, 211DT-H, or the like) that is inert with respect to piston 14, rod 16 and the inside of cylinder 12. Such fluids are well known in the art and will not be discussed further herein. Hydraulic fluid 100 in first chamber 20 communicates with a first reservoir 30 via conduit 32. First reservoir 30 is also filled with hydraulic fluid 100 and is sealed by a flexible diaphragm 34. Further, hydraulic fluid 100 from first reservoir 30 communicates with second chamber 22 via conduits 28 and 36 as controlled by valve 29. Hydraulic fluid 100 in second chamber 22 communicates with a second reservoir 40 via conduits 28 and 46 as controlled by valve 29. Second reservoir 40 is also filled with hydraulic fluid 100 and is sealed by a flexible diaphragm 44. To summarize, chambers 20 and 22, reservoirs 30 and 40, and conduits 28, 32, 36 and 46 are completely filled with hydraulic fluid In an "at rest" mode, assembly 10, with the exception of flexible diaphragm 44, is exposed to a variable pressure environment. Valve 29 is selectively positioned to connect conduits 36 and 28 as shown in FIG. 1. As pressure of the environment increases, flexible diaphragm 34 flexes as indicated by arrow 300 into first reservoir 30 to pressurize hydraulic fluid 100. The pressure buildup in first reservoir 30 is freely communicated to both first chamber 20 and second chamber 22. In this way, seals 18, 24 and 26 are subject to the same pressure both internal and external to cylinder 12.

In an "at work" mode, valve 29 is selectively positioned to connect conduits 46 and 28. A high pressure, indicated by arrow 400, is applied to flexible diaphragm 44. Pressure 400 applied to flexible diaphragm 44 must be greater than that of the environment acting on the remainder of assembly 10 in order to sufficiently pressurize second chamber 22 so that piston 14 moves. Likewise, a low pressure can be applied to flexible diaphragm 44 to cause diaphragm 44 to lower pressure in second chamber 22 to cause piston 14 to move in an opposite direction.

Figure 2:
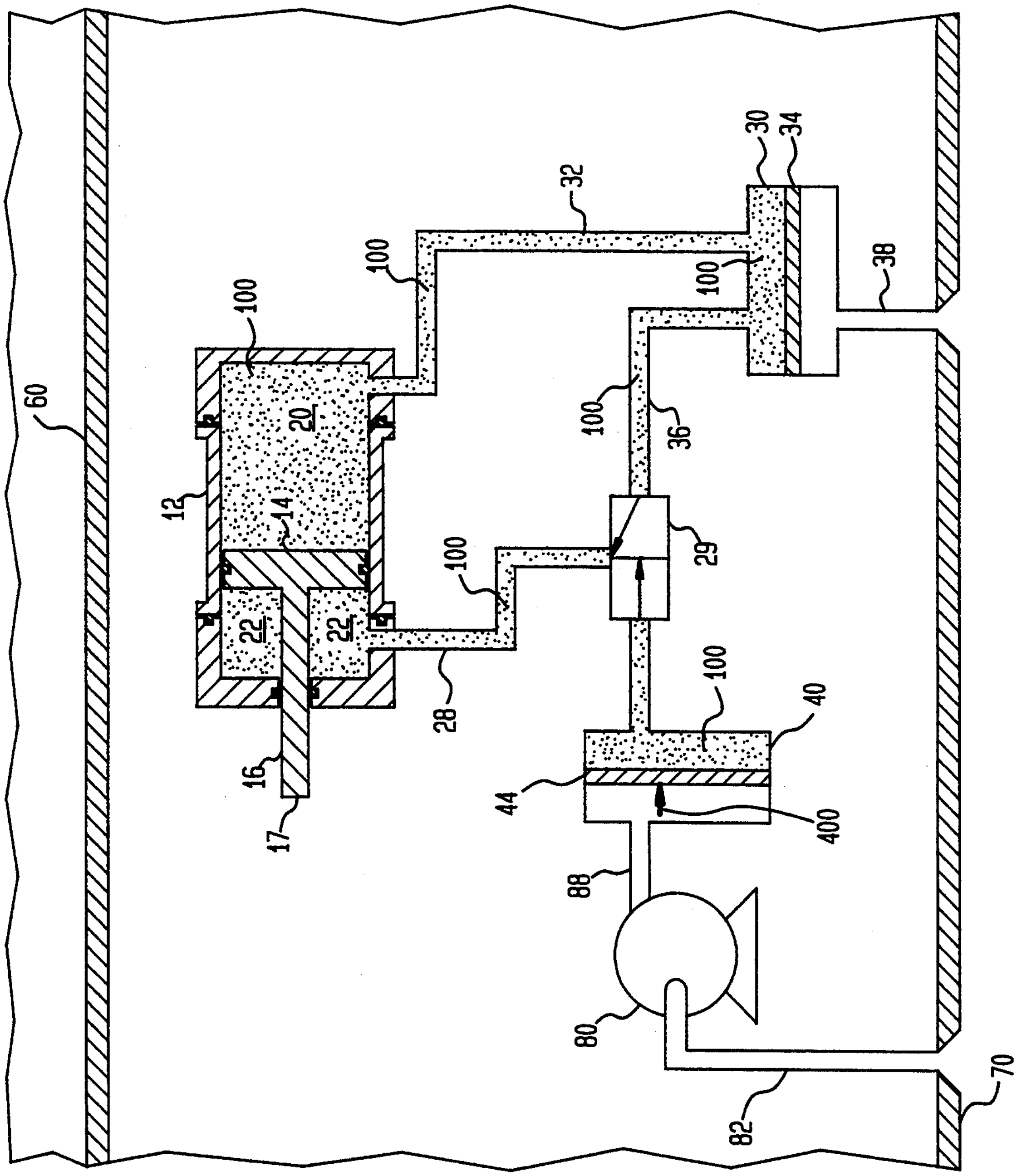
FIG. 2 is a schematic of the hydraulic cylinder assembly of FIG. 1 as it would be installed between the pressure and outer hulls of a submarine.
Figure 3:
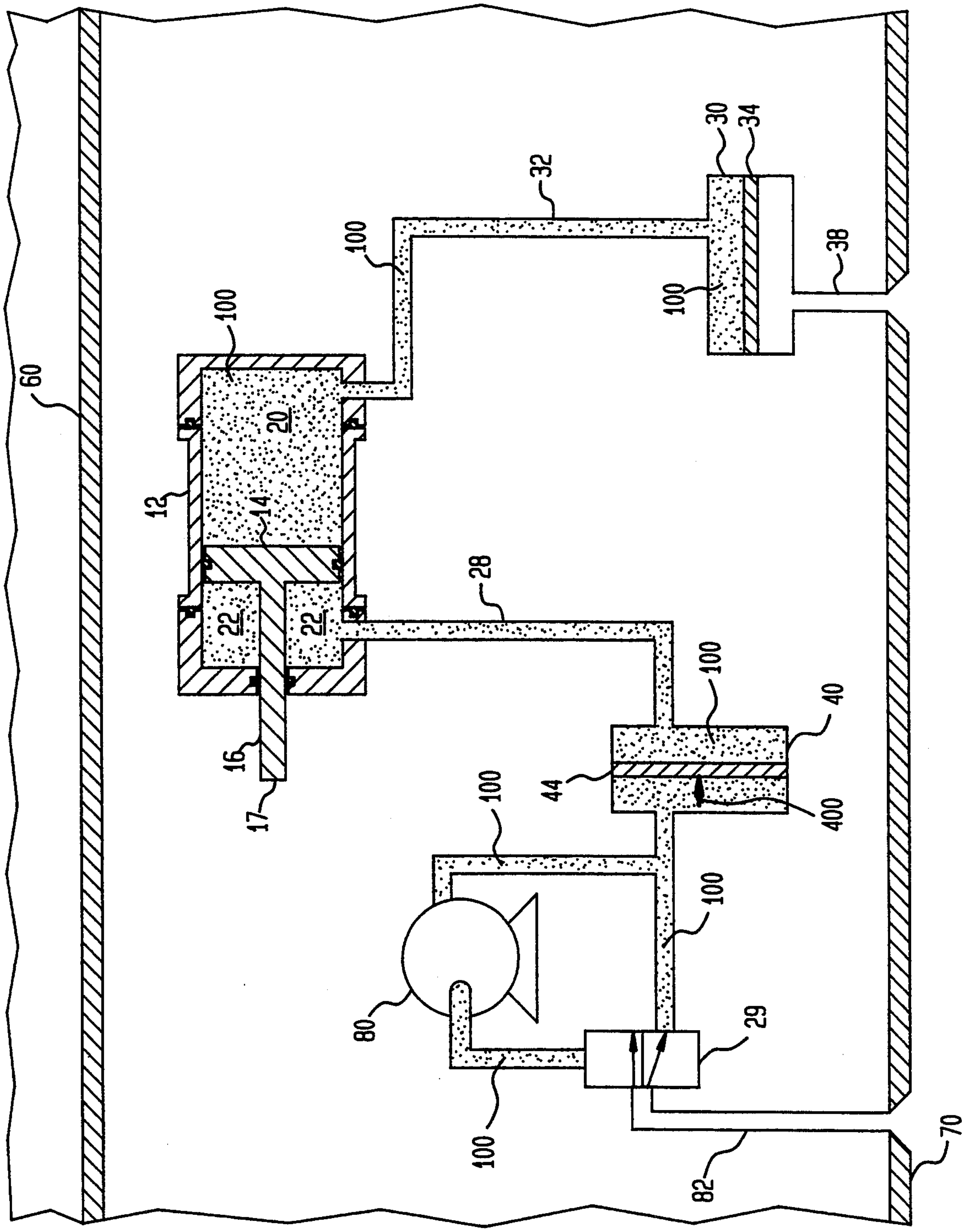
FIG. 3 is a schematic of an alternative embodiment hydraulic cylinder assembly as it would be installed between the pressure and outer hulls of a submarine.

The present invention may be useful for a variety of applications. By way of a non-limiting example, one such application will now be explained with the aid of FIG. 2. In FIG. 2, hydraulic cylinder assembly 10 is shown installed between a submarine's pressure hull 60 and its outer hull 70, both of which are shown in section. The area between pressure hull 60 and outer hull 70 is known as the "free flood area" and is maintained at depth pressure. Those elements common with FIG. 1 have been designated with common reference numerals. Diaphragm 34 is typically arranged to receive seawater through outer hull 70 via conduit 38. Diaphragm 44 receives high pressure 400 via conduit 88 as supplied by a device such as a positive displacement pump 80. In order to minimize the size, weight and cost of pump 80, pump 80 is ported to receive seawater through outer hull 70 via conduit 82. In this way, pump 80 is constantly supplied with seawater at depth pressure and need only overcome depth pressure to provide a sufficient pressure 400 to move piston 14. Note that an alternative approach would be to eliminate conduit 36 and place valve 29 in front of pump 80 as shown in FIG. 3 where like elements have been designated with common reference numerals. In this case, valve 29 is a salt water valve as opposed to a hydraulic fluid valve. Further, in the embodiments in FIGS. 2 and 3, pump 80 could be replaced by a stored energy device such as described in U.S. Pat. No. 4,848,210, the teachings of which are hereby incorporated by reference. In either case, operation of assembly 10 is the same as described above for both the "at rest" and "at work" modes.

Figure 4:
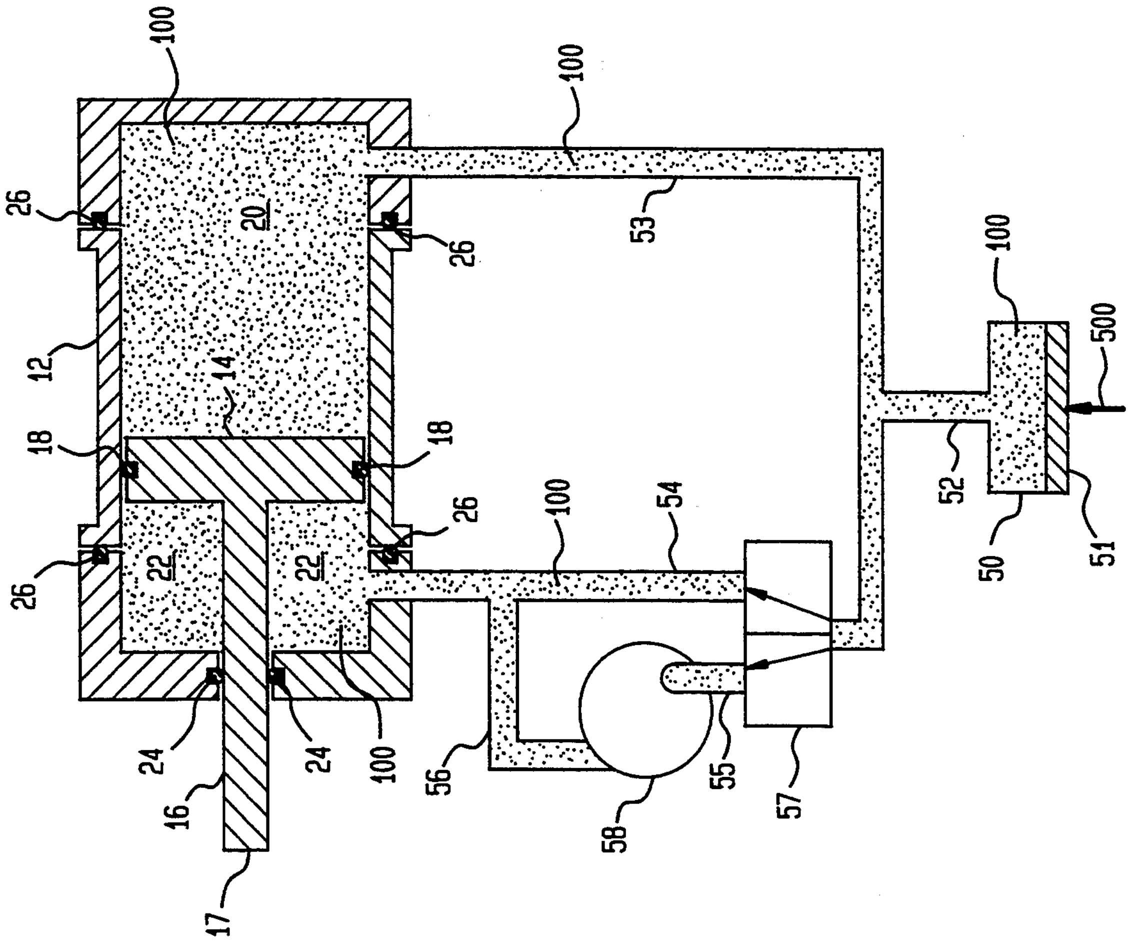
FIG. 4 is a schematic view of another alternative embodiment hydraulic cylinder assembly according to the present invention.

While the present invention has been described relative to a specific embodiment, it is not so limited. For example, as shown in FIG. 4, the present invention can also be based on the use of a single diaphragm 51 continually exposed to a variable pressure environment as indicated by arrow 500. Diaphragm 51 communicates with hydraulic fluid 100 in reservoir 50. As in the earlier embodiments, fluid 100 completely fills reservoir 50, conduits 52–56, and chambers 20 and 22. A valve 57 is provided such that in one position (as shown) conduits 52 and 54 provide fluid 100 pressurized to variable pressure 500 to chamber 22. This serves to pressure balance chamber 22 with chamber 20. In another position, conduits 52 and 55 are connected so that pump 58 can increase (or decrease) the pressure of fluid 100 fed to chamber 22 via conduit 56 in order to move piston 14.

Figure 5:
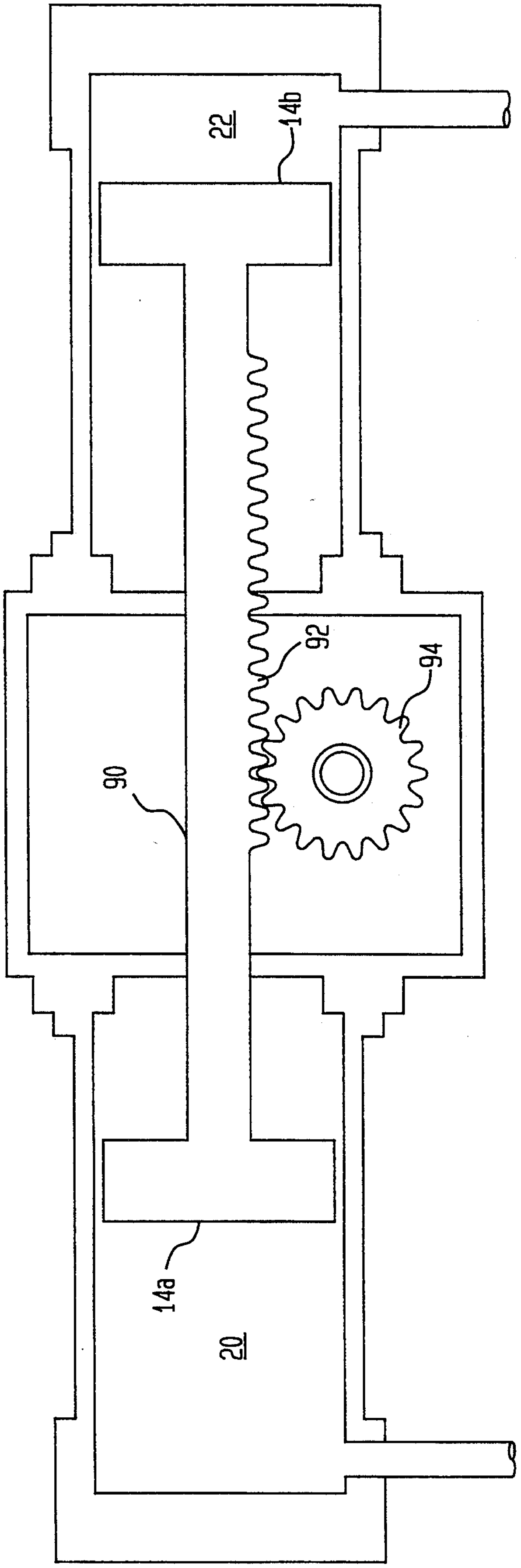
FIG. 5 is a schematic view of an alternative hydraulic cylinder assembly.

In addition, it is to be understood that the configuration of the hydraulic cylinder with its piston is not a limitation of the present invention. For, example, as shown in FIG. 5, the piston can comprise piston faces 14*a* and 14*b* held together by rod 90 having rack gearing 92 that drives a pinion gear 94.

The advantages of the present invention are numerous. Low cost, light duty commercially available cylinders may be used in variable external pressure environments (e.g., undersea) as the internal/external pressures bearing on the cylinder's seals are balanced. In this way, the seals are only influenced by the internal operating pressures for which they were designed. The invention is well suited for undersea hydraulic cylinder applications, particularly those residing between the pressure and outer hull of a submarine. Also, for submarine applications, the design minimizes the number/size of pressure hull penetrations since only small electrical signal lines (not shown) for valve 29 and pump 80 need to be passed through the pressure hull as opposed to larger mechanical penetrations. Further, the present invention permits the use of normally corrosive seawater as the operating fluid without contaminating the hydraulic cylinder. Finally, in terms of a submarine, the readily available operating fluid (i.e., seawater) can be used in a balanced power stroke circuit. Other applications that are appropriate for the present invention are cylinder assemblies used at variable depths in the oil refining/drilling industries and the cable/pipe laying industries, and cylinder assemblies used in land based hydraulic test tanks.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A hydraulic cylinder assembly for use in a variable pressure environment, comprising:
   - a hydraulic cylinder immersed in said variable pressure environment, said hydraulic cylinder having two chambers and a piston interposed between said two chambers;
   - hydraulic fluid for filling said two chambers;
   - pressurizing means in hydraulic communication with said two chambers for normalizing a pressure of said hydraulic fluid in said two chambers to a pressure of said variable pressure environment, wherein said pressurizing means includes a diaphragm having first and second sides, said first side exposed to said pressure of said variable pressure environment and said second side exposed to said hydraulic fluid; and
   - pressure varying means in hydraulic communication with one of said two chambers for selectively varying said pressure of said hydraulic fluid from said pressure of said variable pressure environment in said one of said two chambers such that said piston moves.

2. A hydraulic cylinder assembly as in claim 1 wherein said hydraulic fluid is inert with respect to said two chambers and said piston.

3. A hydraulic cylinder assembly for use in a variable pressure environment, comprising:

a hydraulic cylinder immersed in said variable pressure environment, said hydraulic cylinder having two chambers and a piston interposed between said two chambers;

hydraulic fluid for filling said two chambers;

pressurizing means in hydraulic communication with said two chambers for normalizing a pressure of said hydraulic fluid in said two chambers to a pressure of said variable pressure environment; and pressure varying means in hydraulic communication with one of said two chambers for selectively varying said pressure of said hydraulic fluid from said pressure of said variable pressure environment in said one of said two chambers such that said piston moves, said pressure varying means comprising a pump normalized to said pressure of said variable pressure environment, said pump varying its output with respect to said pressure of said variable pressure environment, an additional diaphragm having first and second sides, said first side of said additional diaphragm exposed to said pump's output and said second side of said additional diaphragm exposed to said hydraulic fluid, and a valve interposed between said second side of said diaphragm and said second side of said additional diaphragm for selectively exposing one of said second side of said diaphragm and said second side of said additional diaphragm to said one of said two chambers via hydraulic communication.

4. A hydraulic cylinder assembly for use in a variable pressure environment, comprising:

a hydraulic cylinder immersed in said variable pressure environment, said hydraulic cylinder having two chambers and a piston interposed between said two chambers;

hydraulic fluid for filling said two chambers;

pressurizing means in hydraulic communication with said two chambers for normalizing a pressure of said hydraulic fluid in said two chambers to a pressure of said variable pressure environment; and pressure varying means in hydraulic communication with one of said two chambers for selectively varying said pressure of said hydraulic fluid from said pressure of said variable pressure environment in said one of said two chambers such that said piston moves, said pressurizing means comprising a first diaphragm having first and second sides, said first side of said first diaphragm exposed to said pressure of said variable pressure environment and said second side of said first diaphragm exposed to said hydraulic fluid in communication with said hydraulic fluid in a second of said two chambers, a second diaphragm having first and second sides, said second side of said second diaphragm exposed to said hydraulic fluid in communication with said hydraulic fluid in said one of said two chambers, and a valve interposed between said variable pressure environment and said first side of said second diaphragm wherein, in one position, said valve admits said pressure of said variable pressure environment directly to said first side of said second diaphragm.

5. A hydraulic cylinder assembly as in claim 4 wherein said pressure varying means is a pump for varying its output with respect to said variable pressure environment, said pump being interposed between said valve and said first side of said second diaphragm wherein, in another position, said valve admits said pressure of said variable pressure environment to said pump.

6. A hydraulic cylinder assembly for use in a variable pressure environment, comprising:

a hydraulic cylinder immersed in said variable pressure environment, said hydraulic cylinder having two chambers and a piston interposed between said two chambers;

hydraulic fluid for filling said two chambers;

pressurizing means in hydraulic communication with said two chambers for normalizing a pressure of said hydraulic fluid in said two chambers to a pressure of said variable pressure environment; and pressure varying means in hydraulic communication with one of said two chambers for selectively varying said pressure of said hydraulic fluid from said pressure of said variable pressure environment in said one of said two chambers such that said piston moves, said pressure varying means comprising a valve interposed between said second side of said diaphragm and said one of said two chambers, and a hydraulic fluid pump interposed between said valve and said one of said two chambers for varying its output with respect to said pressure of said variable pressure environment wherein, in one position, said valve admits said hydraulic fluid directly to said one of said two chambers and wherein, in another position, said valve admits said hydraulic fluid to said one of said two chambers via said hydraulic fluid pump.

7. A hydraulic cylinder assembly for undersea usage at a plurality of depths each of said plurality of depths having a depth pressure, comprising:

a hydraulic cylinder exposed to said depth pressure, said hydraulic cylinder having two chambers and a piston interposed between said two chambers;

a first reservoir having hydraulic fluid therein;

a first diaphragm mounted in said first reservoir and in hydraulic communication with hydraulic fluid in said first reservoir, said first diaphragm exposed to said depth pressure such that said depth pressure deflects said first diaphragm to pressurize hydraulic fluid in said first reservoir to said depth pressure;

a second reservoir having hydraulic fluid therein;

a second diaphragm mounted in said second reservoir and in hydraulic communication with hydraulic fluid in said second reservoir, said second diaphragm exposed to a pressure different than said depth pressure such that said pressure different than said depth pressure deflects said second diaphragm to cause hydraulic fluid in said second reservoir to pressurize to said pressure different from said depth pressure; and means for selectively porting said first and second reservoirs to said two chambers such that 1) only hydraulic fluid at said depth pressure is ported to said two chambers when said hydraulic cylinder assembly is at rest, and 2) hydraulic fluid in said first reservoir is ported to a first of said two chambers while hydraulic fluid in said second reservoir is ported to a second of said two chambers when said hydraulic cylinder assembly is at work for allowing said pressure different from said depth pressure to cause movement of said piston.

8. A hydraulic cylinder assembly as in claim 7 wherein said means for selectively porting is a valve.

9. A hydraulic cylinder assembly for undersea usage at a plurality of depths each of said plurality of depths having a depth pressure, comprising:

a hydraulic cylinder exposed to said depth pressure, said hydraulic cylinder having two chambers and a piston interposed between said two chambers;

a first reservoir having hydraulic fluid therein;.

a first diaphragm mounted in said first reservoir and in hydraulic communication with hydraulic fluid in said first reservoir, said first diaphragm exposed to exposed depth pressure such that said depth pressure deflects said first diaphragm to pressurize hydraulic fluid in said first reservoir to said depth pressure;

a second reservoir having hydraulic fluid therein;.

a second diaphragm mounted in said second reservoir and in hydraulic communication with hydraulic fluid in said second reservoir, said second diaphragm exposed to a pressure different than said depth pressure such that said pressure different than said depth pressure deflects said second diaphragm to cause hydraulic fluid in said second reservoir to pressurize to said pressure different from said depth pressure; and means for selectively porting said first and second reservoirs to said two chambers such that 1) only hydraulic fluid at said depth pressure is ported to said two chambers when said hydraulic cylinder assembly is at rest, and 2) hydraulic fluid in said first reservoir is ported to a first of said two chambers while hydraulic fluid in said second reservoir is ported to a second of said two chambers when said hydraulic cylinder assembly is at work for allowing said pressure different from said depth pressure to cause movement of said piston, wherein said means for selectively porting is a valve, wherein said valve is interposed between said first and second diaphragms and said second of said two chambers.

10. A hydraulic cylinder assembly for undersea usage at a plurality of depths each of said plurality of depths having a depth pressure, comprising:

a hydraulic cylinder exposed to said depth pressure, said hydraulic cylinder having two chambers and a piston interposed between said two chambers;

a first reservoir having hydraulic fluid therein;

a first diaphragm mounted in said first reservoir hydraulic communication with hydraulic fluid in said first reservoir, said first diaphragm exposed to said depth pressure such that said depth pressure deflects said first diaphragm to pressurize hydraulic fluid in said first reservoir to said depth pressure;

a second reservoir having hydraulic fluid therein;

a second diaphragm mounted in said second reservoir and in hydraulic communication with hydraulic fluid in said second reservoir, said second diaphragm exposed to a pressure different than said depth pressure such that said pressure different than said depth pressure deflects said second diaphragm to cause hydraulic fluid in said second reservoir to pressurize to said pressure different from said depth pressure; and means for selectively porting said first and second reservoirs to said two chambers such that 1) that hydraulic fluid at said depth pressure is ported to said two chambers when said hydraulic cylinder assembly is at rest, and 2) hydraulic fluid in said first reservoir is ported to a first of said two chambers while hydraulic fluid in said second reservoir is ported to a second of said two chambers when said hydraulic cylinder assembly is at work for allowing said pressure different from said depth pressure to cause movement of said piston, wherein said means for selectively porting is a valve, wherein said valve is interposed between said second diaphragm and said depth pressure.

11. A hydraulic cylinder assembly for undersea usage at a each of said plurality of depths having a depth pressure comprising:

a hydraulic cylinder exposed to said depth pressure, said hydraulic cylinder having two chambers and a piston interposed between said two chambers;

a first reservoir having hydraulic fluid therein;

a first diaphragm mounted in said first reservoir hydraulic communication with hydraulic fluid in said first reservoir, said first diaphragm exposed to said depth pressure such that said depth pressure deflects said first diaphragm to pressurize hydraulic fluid in said first reservoir to said depth pressure;

a second reservoir having hydraulic fluid therein;

a second diaphragm mounted in said second reservoir and in hydraulic communication with hydraulic fluid in said second reservoir, said second diaphragm exposed to a pressure different than said depth pressure such that said pressure different than said depth pressure deflects said second diaphragm to cause hydraulic fluid in said second reservoir to pressurize to said pressure different from said depth pressure;

means for selectively porting said first and second reservoirs to said two chambers such that 1) only hydraulic fluid at said depth pressure is ported to said two chambers when said hydraulic cylinder assembly is at rest, and 2) hydraulic fluid in said first reservoir is ported to a first of said two chambers while hydraulic fluid in said second reservoir is ported to a second of said two chambers when said hydraulic cylinder assembly is at work for allowing said pressure different from said depth pressure to cause movement of said piston; and means for generating said pressure different from said depth pressure wherein said hydraulic cylinder assembly is disposed between a submarine's pressure hull and outer hull.

12. A hydraulic cylinder assembly as in claim 11 wherein said means for generating said pressure different from said depth pressure is a positive displacement pump.

13. A hydraulic cylinder assembly as in claim 11 wherein said means for generating said pressure different from said depth pressure is a stored energy device.

14. A hydraulic cylinder assembly as in claim 9 further comprising means for generating said pressure different from said depth pressure exposed to said second diaphragm.

15. A hydraulic cylinder assembly as in claim 14 wherein said means for generating said pressure different from said depth pressure is a positive displacement pump.

16. A hydraulic cylinder assembly as in claim 14 wherein said means for generating said pressure different from said depth pressure is a stored energy device.

17. A hydraulic cylinder assembly as in claim 10 further comprising means for generating said pressure different from said depth pressure interposed between said valve and said second diaphragm.

18. A hydraulic cylinder assembly as in claim 17 wherein said means for generating said pressure different from said depth pressure is a positive displacement pump.

19. A hydraulic cylinder assembly as in claim 17 wherein said means for generating said pressure different from said depth pressure is a stored energy device.

* * * * *